United States Patent [19]

Wong

[11] 4,336,599
[45] Jun. 22, 1982

[54] CIRCUIT FOR PERFORMING A SQUARE ROOT CALCULATION

[75] Inventor: Wilson T. C. Wong, Irvine, Calif.

[73] Assignee: Sperry Corporation, New York, N.Y.

[21] Appl. No.: 157,500

[22] Filed: Jun. 9, 1980

[51] Int. Cl.³ .............................................. G06F 7/552
[52] U.S. Cl. .................................... 364/752; 364/748
[58] Field of Search ................................ 364/748, 752

[56] References Cited

U.S. PATENT DOCUMENTS 3,049,296  8/1962  Hertz et al. ........................ 364/752
3,280,314  10/1966  Weigler .............................. 364/752

OTHER PUBLICATIONS

C. V. Ramamoorthy et al., "Some Properties of Iterative Square-Rooting Methods Using High-Speed Multiplication", *IEEE Transactions on Computers*, vol. C-21, No. 8, 8-1972, pp. 837-847.

Primary Examiner—Jerry Smith
Attorney, Agent, or Firm—G. Donald Weber, Jr.; Eugene T. Battjer

[57] ABSTRACT

There is disclosed a circuit which is capable of performing a square root function in a floating point processor in such a manner that the speed of operation is increased by approximately 50%.

21 Claims, 10 Drawing Figures

LINEAR APPROXIMATION FOR THE WHOLE INTERVAL FROM .5 TO 1.0

FIG. 1A

LINEAR APPROXIMATION FOR A SMALLER INTERVAL

CIRCUIT FOR PERFORMING A SQUARE ROOT CALCULATION

BACKGROUND

1. Field of the Invention

This invention is directed to a floating point processor circuit and the CPU interfaced with it, in general, and to a circuit which performs a square root function, in particular.

2. Prior Art

Many computer devices include a floating point processor as a portion thereof. The floating point processor can be operated to perform add, subtract, multiply, divide, and, sometimes, square root functions. Typically, the square root function, as performed by existing circuitry, is quite slow or requires extensive hardware components. Typically, the existing circuitry utilizes the Heron Iteration Process which is inherently slow as described hereinafter. Consequently, in order to enhance the speed of operation of existing circuitry, it is highly desirable to perform the square root function with circuitry which is both fast and economical.

SUMMARY OF THE INVENTION

The invention comprises circuitry for performing a square root function on a floating point number. The floating point number is supplied to an instruction register which stores and transfers the number to a decoder network. The decoder network which decodes instructions also decodes the floating point number and initiates an appropriate microprogram. The microprogram calculates first approximation of the squareroot of the floating point number by linear approximation. The decoder causes different branches of the microprogram to be initiated depending on the value of the floating point number. Therefore, different constants may be used for the linear approximation depending on the value of the floating point number and a highly accurate first approximation may be obtained. Fewer Heron Iterations will be necessary in order to attain the required accuracy for the final result and, thus, time is saved.

DESCRIPTION OF A PREFERRED EMBODIMENT

INTRODUCTION

Typically, the squareroot calculation of a floating point number is carried out by obtaining a linear approximation using the value "F", the squareroot of which is to be found. Thereafter, the so-called "Heron" equation is applied to the approximation in order to achieve the desired accuracy. This operation can be achieved by designating an approximation of $\sqrt{F}$ which value is called $y_0$. This value is then used in the Heron equation $$y_1 = \tfrac{1}{2}[y_0 + F/y_0].$$

In performing this operation, the value of $y_1$ is more accurate than the value of $y_0$ as the approximation of the squareroot of the function F. This operation can be repeated by substituting the value $y_1$ for the value $y_0$ in the equation and obtaining the value $y_2$ which is even more accurate as an approximation of the squareroot of F. The operation can be continued or iterated to obtain a greater degree of accuracy. The number of iterations which can be utilized is a function of the degree of accuracy which is required. For example, if the function $y_0$ has N bits of accuracy, then the function $y_1$ has approximately $2N+1$ bits of accuracy. This method is described in many textbooks, such as:

1. J. F. Haits, et al., *Computer Aproximations*, New York: Wiley, 1968.
2. W. J. Cody and H. M. Waite, "Software Manual Working Note #1, Preliminary Draft of Chapters 1–4d," *Technical Memorandum* No. 321, Argonne, Illinois: Applied Mathematics Division, Argonne National Laboratory, 1977.

Thus, it can be shown in order to obtain an accuracy of 56 bits on the mantissa of the floating point number, the accuracy required in the first approximation is 27.5 bits if only one iteration is to be performed. Likewise, for two or three iterations, the accuracy of the first approximation must be 13.25 bits or 6.125 bits.

Typically, the first approximation is obtained by a linear approximation $y_0 = a_1 + b_1 x$ for its simplicity. The coefficients $a_1$ and $b_1$ represent the additive and multiplicative constants, respectively. These constants are optimized for the range of interest (that is, the interval which contains all of the numbers for which it is desired to find the squareroots) so that the maximum relative error is minimized for that interval.

In a squareroot operation on a floating point number, only the squareroot of the mantissa part of the number needs to be found with this method. The exponent of the squareroot may be found by merely dividing the exponent of the floating point number by two. For example, obtaining the squareroot of the $0.1001 \times 2^4$ can be expressed as follows:

$$\sqrt{.1001 \times 2^4} = \sqrt{.1001} \times \sqrt{2^4} = \sqrt{.1001} \times 2^{(4/2)}$$

Figure 1A:
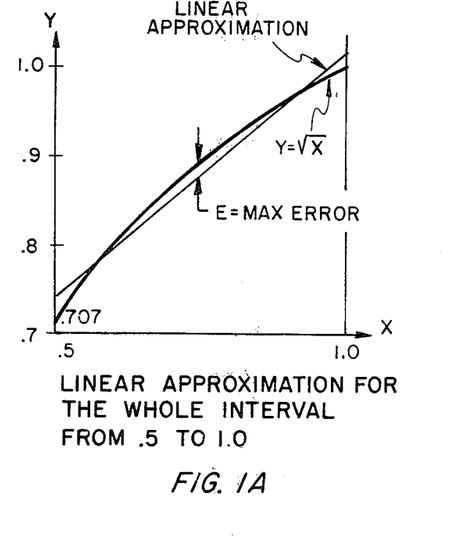
FIGS. 1A and 1B are graphic representations of linear approximations of square root values.

For a normalized floating point number, that is, a number with the most significant bit of the mantissa equal to 'one', the mantissa has a value between 0.5 and 1. The floating point number format used in this invention is slightly different. The binary point is defined to be at the right of the leading "one" instead of to the left of the leading "one". Therefore, the mantissa has a value between 1 and 2. However, this discussion still applies. Therefore, the additive and the multiplicative constants may be optimized for this interval. The accuracy which can be obtained from a linear approximation over the interval between 0.5 and 1 is approximately 7 bits (see FIG. 1A). Hence, the Heron equation has to be applied three times to obtain the desired accuracy of 56 bits for the mantissa of the squareroot.

Figure 1B:
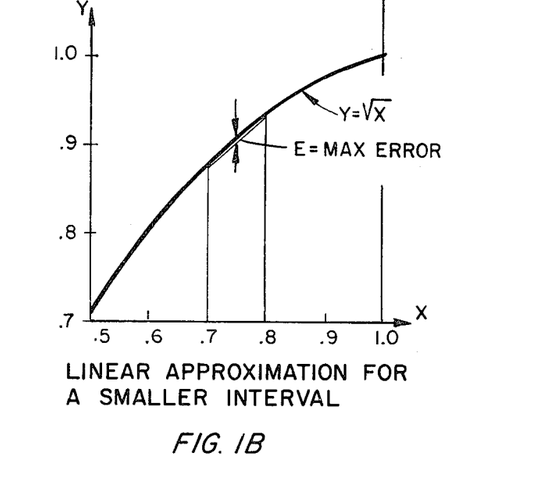

If the range of the mantissa of the floating point number of which the squareroot is to be found is subdivided into finer intervals and a pair of additive and multiplicative constants are selected for each interval, a first approximation of higher accuracy may be obtained (see FIG. 1B). The comparisons between the respective accuracy aspects is clearly shown by a comparison of the graphical representations shown in FIGS. 1A and 1B.

In the instant invention, the range of the mantissa is subdivided into 16 equal intervals. The instruction decoder circuit is used to determine which interval the mantissa of the floating point number belongs to and the appropriate additive and multiplicative constants are used. An accuracy of better than 14 bits is obtained for the first approximation. Therefore, the Heron equation has to be applied only twice, thus, speeding up the squareroot operation.

THE INSTANT INVENTION

Figure 2:
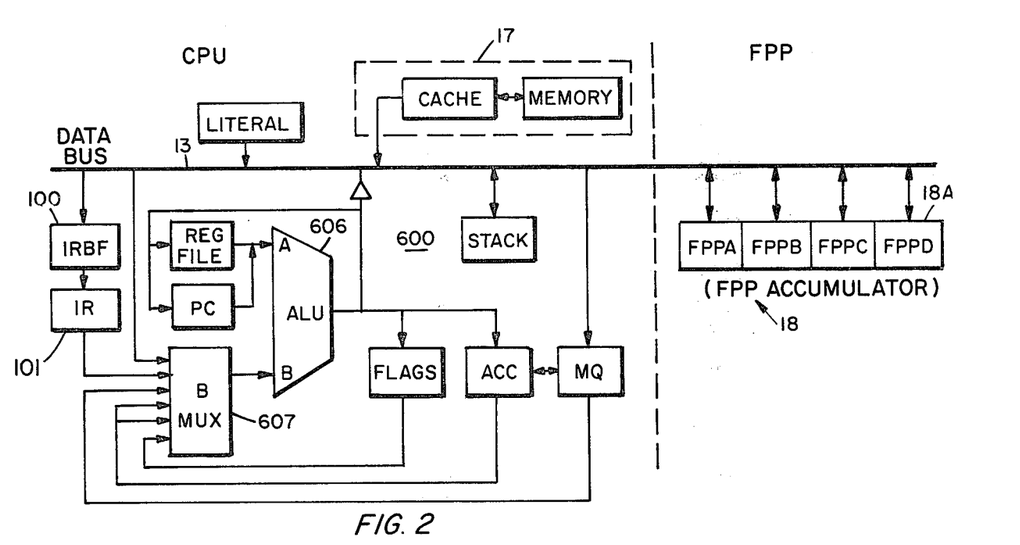
FIG. 2 is a block diagram of a central processing unit interfaced with a memory and a floating point processor.

Referring to FIG. 2, there is shown a block diagram of a Central Processing Unit (CPU) 600 interfaced to memory 17 and a floating point processor (FPP) 18. A data bus 13 links the CPU, the memory and the FPP. Instructions may be fetched from the memory and stored in the instruction buffer (IRBF) 100, and then transferred to the instruction register (IR) 101 for decoding. Data, such as a floating point number, may also be fetched via the data bus from memory or from the FPP accumulator 18A. Usually, the data are operated on by the Arithmetic and Logic Unit (ALU) 606 by passing the data through the B multiplexer (B MUX) 607. The output from the ALU is supplied to the flags circuit, the accumulator circuit or to the data bus as shown. However, in this architecture, data may also be loaded into the instruction buffer 100 and then transferred to the instruction register 101. Therefore, the data may also be decoded by the instruction decoding circuits which, in turn, may cause the microprogram to go to different branches depending upon the value of the data. In this particular implementation, the microaddress of the next microinstruction to be executed is generally specified by bits 33 to 47 of the present microinstructions control store buffer (see FIG. 3). That is, the current microinstruction includes the microaddress of the next instruction.

DEFINITION OF THE DIFFERENT MICROINSTRUCTION FORMATS

When bit 47 is a "0", the Conditional Jump format obtains. Bits 46 through 42 comprise the jump condition field. A total of 32 test conditions and/or machine statuses may be specified to be tested. If the condition is "true", the next microinstruction is specified by the address indicated by bits 41 through 33, (i.e., the CAD and RAD fields).

When bit 47 is a "1" and bit "46" is a "0", the Unconditional Jump format obtains. The jump address is specified by bits 45 through 33 (the PGA, CAD and RAD fields).

When bit 47 is a "1", bit 46 is a "1" and bit 45 is a "0", the Field Select format obtains. The FLD field specifies a 4-bit field in the instruction register or the MQ register. Since the FLD field consists of 3-bits, a total of 8 different fields may be selected. The 4-bit field selected may be masked by the bit-mask provided by the MSK field of the microinstruction. The result is then concatenated to the CAD field which contains the column address to form the next microinstruction address. In other words, the 4-bit field selected becomes the row address of the next microinstruction.

When bits 47 through 45 are all "1's", the Literal format obtains. For this format the next microinstruction is always the microinstruction sequentially following the current microinstruction.

| DEFINITIONS OF THE MICROINSTRUCTION FIELDS | |
|---|---|
| JCOND | Jump condition field |
| CAD | Column address |
| RAD | Row address |
| PGA | Page address |
| FLD | Instruction register or MQ register 4-bit fields to be selected |
| MSK | Mask which may be used to mask off some bits in the 4-bit field selected |
| LITERAL | A 16-bit pattern which may be used as a piece of data or an address. |
| SP | Special field which may specify/invoke 32 different special operations |
| BS/LIT | Field which specifies the data to be sent to the B side of the ALU. (May also be used to store part of the LITERAL). |
| ALU | Specifies mode of register file operation |
| RD | Specifies which register in the register file will be used as the source register |
| RFS | Specifies which register in the register file will be used as the source register |
| RFD | Specifies which register in the register file should be used as the destination register. |
| DEST | Specifies the destination of the result of an ALU operation should go to |
| MC | Memory control field. |
| CBD | Specifies the destination of the CB bus. |

Figure 3:
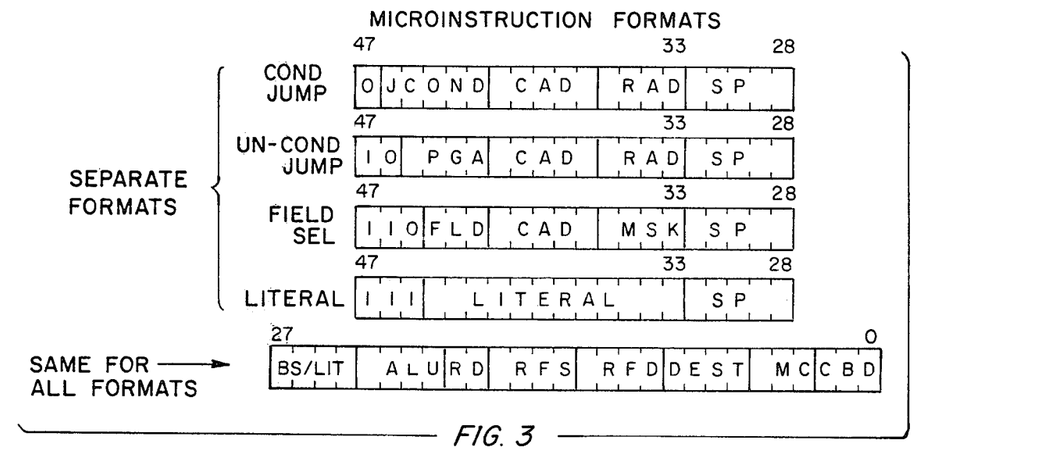
FIG. 3 is a representation of the formats for microinstructions used in the instant invention.

As seen in FIG. 3, there are four separate addressing formats (bits 28–47) which define the method used to generate the next address from the various addressing elements in the control loop. Addressing elements (see FIG. 5) and addressing formats are defined below:

A. Addressing Elements
  (1) Instruction Register
    The instruction register 101 holds the 16-bit instruction currently in execution. It also may be loaded by a SP field command, SPLDIR (also part of the microinstruction).
  (2) Control Store Buffer
    The contents of the control store buffer 10 not only specify the addressing formats, but may in certain formats specify portions, or all of the next address.
  (3) Here Plus One Register The Here Plus One register 11 is a 13-bit register conceptually divided into three parts. The least significant 4 bits are termed the row address, the next 5 bits are termed the column address, and the most significant 4 bits are termed the page address (see FIG. 4). The Here Plus One register always contains the address of the present microinstruction incremented by one.

(4) Pre-Decoder

The pre-decoder 14 is a logic element which performs a mapping from the contents of the instruction to the next control store address.

(5) Subroutine Return Stack

The subroutine return stack 12 is a 16 register by 12 bit stack used to store microinstruction addresses for use in high speed subroutine returns.

(6) Field Select MUX

The Field Select MUX 102 is a logic element (an 8 to 1 multiplexer) which selects a four-bit field from the instruction register (or possibly the accumulator) for use in specifying the next row address in field select addressing. Instruction Register Fields that may be specified are listed in Table I below. The instruction register field is presented directly to mask logic for formation of the next row address specification.

TABLE I

| FLD Code | Field Specified | Input to Row Add | | | |
|---|---|---|---|---|---|
| | | RAD3 | RAD2 | RAD1 | RAD0 |
| 0 | IR(03–00) | IR02 | IR01 | IR00 | IR03 |
| 1 | IR(06–03) | IR06 | IR05 | IR04 | IR03 |
| 2 | IR(09–06) | IR09 | IR08 | IR07 | IR06 |
| 3 | IR(12–09) | IR12 | IR11 | IR10 | IR09 |
| 4 | IR(15–12) | IR15 | IR14 | IR13 | IR12 |
| 5 | Spare | IR05 | IR04 | IR03 | IR06 |
| 6 | ACC(03–00) | ACC03 | ACC02 | ACC01 | ACC00 |
| 7 | PRDE(3–0) | PRDE3 | PRDE2 | PRDE1 | PRDE0 |

(7) Conditional Jump Multiplexer

The conditional jump multiplexer is 32-to-one multiplexer used to switch various processor flags into addressing logic for implementation of the conditional jump microformat. The area of memory interest in this invention is the field select microinstruction format and the related addressing elements, specifically, the instruction register 101 and the field select multiplexer 103.

Figure 5:
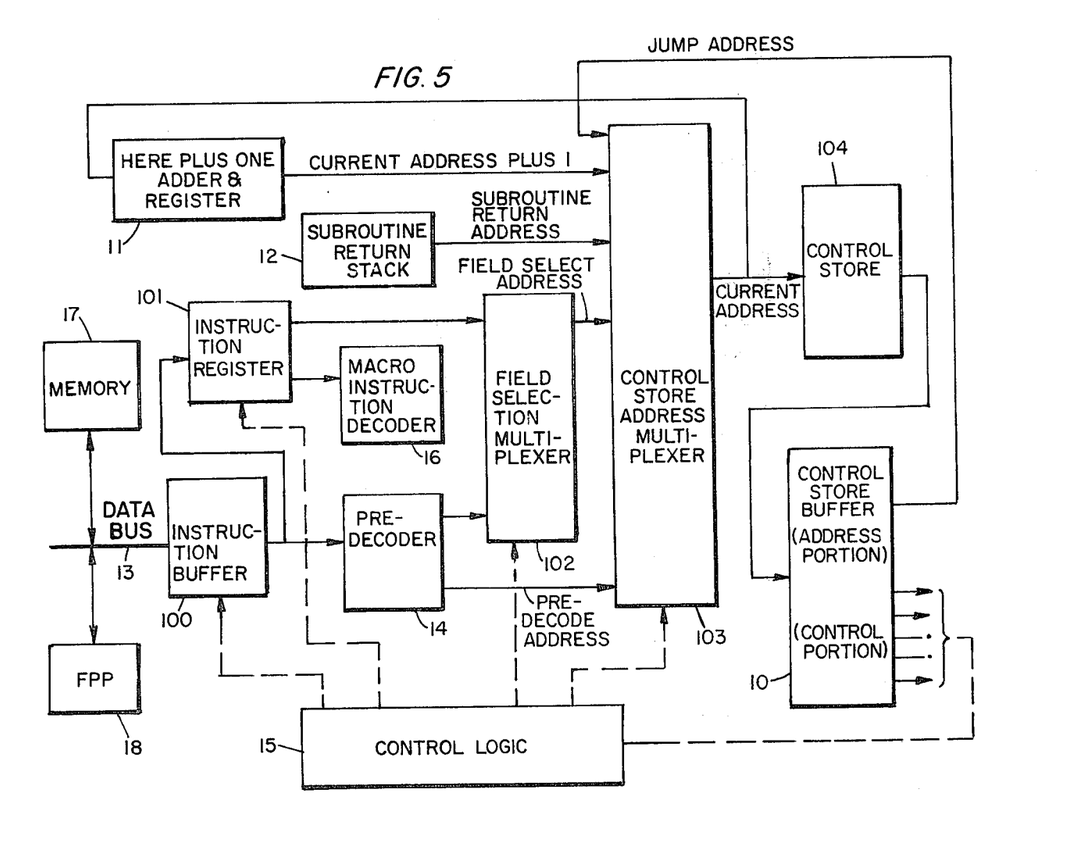
FIG. 5 is a more detailed block diagram of the control circuit for the CPU of the instant invention.

Referring now to FIG. 5, there is shown a block diagram of the control circuit of the CPU. In this Figure the components bearing 3-digit reference numerals are pertinent to the specific invention involved while the components identified by 2-digit reference numerals are supportive or control elements which are not part of the invention, per se. These support or peripheral elements are described for purposes of understanding the function of the circuit in the overall system.

Memory 17 or FPP 18, via data bus 13, supplies 16-bit word to instruction buffer 100 which word is then passed to instruction register 101 and to pre-decoder 14. The 16-bit word is usually an instruction. However, data may also be loaded into the instruction buffer intentionally, as described above. Pre-decoder 14 decodes the 16-bit word and supplies an address to field selection multiplexer 102 and to control store address multiplexer 103. The field selection multiplexer 102 may also decode various 4-bit groups (each called a field) stored in the instruction register 101 and supply an address to control store address multiplexer 103. In addition, the control store address multiplexer 103 may receive addresses from three other sources. One of the sources is the Here Plus One Adder and Register 11 which supplies an address sequential to the current address being used to address the control store 104. A second source is the control store buffer 10 which supplies a jump address. A third source is the subroutine return stack 12 which supplies a subroutine return address. The control store address multiplexer 103 selects one of these addresses and sends it to the control store 104 which stores all the microinstructions. Therefore, the next microinstruction to be executed depends on where this address comes from and how it is formed. Control logic 15 supplies the control signals to control the operation of the control store multiplexer 103.

Figure 4:
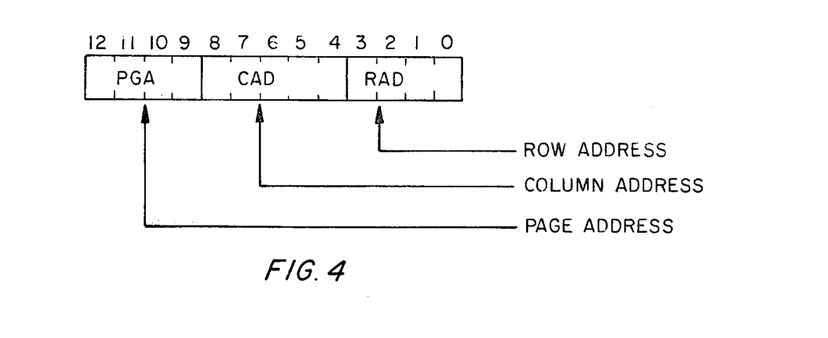
FIG. 4 is a representation of a microaddress used in the instant invention.

The address that is used to address the control store 104 has the format shown in FIG. 4. The address is 13 bits long and is divided into three fields, namely, a four-bit field which contains the page address (PGA), a five-bit field which contains the column address (CAD), and another four-bit field which contains the row address (RAD).

When the field selection multiplexer 102 is selected by the control store multiplexer 103 to provide the address for the next microinstruction, the page address will be equal to the page address of the current microinstructions. The column address will be supplied by the column address field of the current microinstruction, and the row address will be supplied by the field selection multiplexer 102. The field selection multiplexer 102 selects one out of 8 groups of bits in this implementation of the invention. Each group of bits consists of 4 bits. For example, the field selection multiplexer 102 may select the group which consists of bits 3, 4, 5, 6 of the instruction register 101. Then bits 3, 4, 5, 6 of the instruction register 101 will be supplied by the field selection multiplexer 102 to control store address multiplexer 103 and eventually become the row address of the microinstruction address. Each of these bits may also be masked to zero. It can be seen that if the bits selected by the field selection multiplexer 102 change in value the microinstruction address also changes accordingly. Therefore, different microinstructions will be executed depending upon the bit pattern of the group of bits selected by the field selection multiplexer 102.

This method is commonly used in computers to decode instructions. Different instructions represented by different bit patterns will initiate different microinstructions. Therefore, different operations will be carried out by the computer. However, in this invention, since a piece of data, in particular, the first word of a floating point number may be loaded into the instruction buffer 100 and then transferred to the instruction register 101, different microinstructions may be initiated according to the value of the floating point number.

Figure 6:
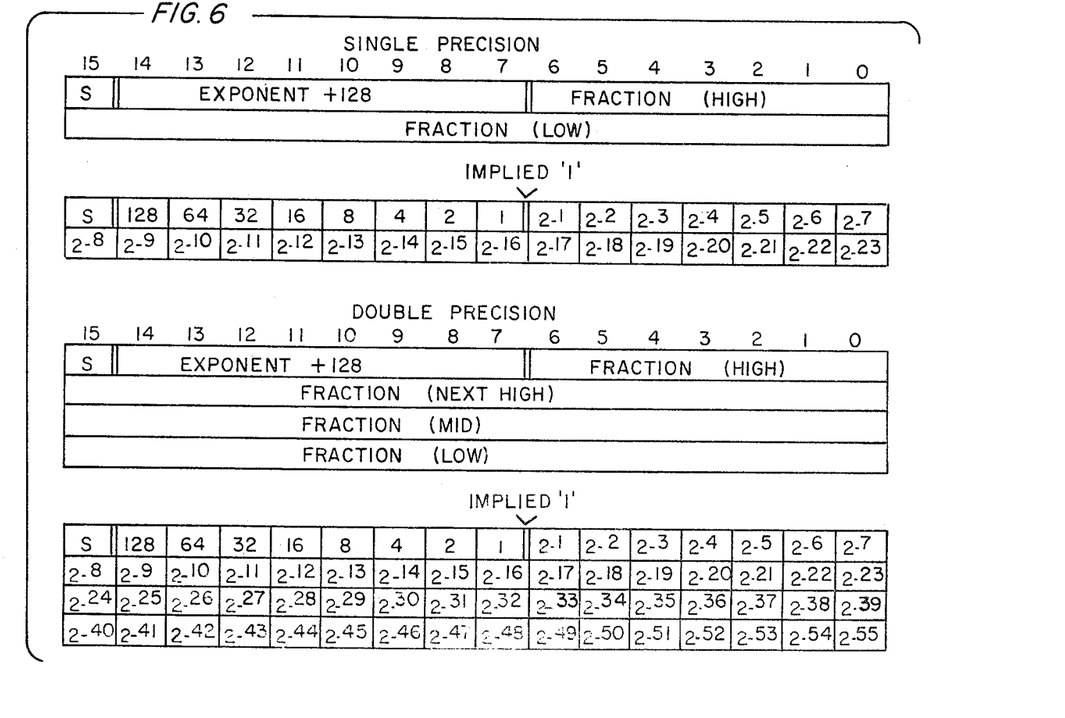
FIG. 6 is a representation of floating point number formats with bit weighting.

The floating point number used in this invention is represented by the diagram of FIG. 6. As can be seen in FIG. 6, the first words of both the single precision floating point number and the double precision floating point number are the same. In this floating point number format, the leading "one" of the mantissa of the number is not stored as part of the format. This is indicated by the implied "1". The binary point is defined to be after this leading "one". Therefore, bit 6 of the first word represents the most significant fractional bit with a weight of $2^{-1}$. Bit 5 of the first word represents the second most significant fractional bit with a weight of $2^{-2}$ and so on. Table II shows the value of the floating point number with various bit combinations at bit positions 3, 4, 5, and 6 of the first word. In operation, the first word of the floating point number is loaded into the instruction buffer 100 and transferred to the instruction register 101. If bits 3, 4, 5, and 6 are used to form the row address of the microinstruction address by means of the field selection multiplexer 102, a floating point number with the mantissa value between 1.00 and 1.0625 will initiate the microinstruction with a row address of "0000". Likewise, a floating point number with the mantissa value between 1.0625 and 1.125 will initiate the microinstruction with the row address of "0001" and so on. Therefore, different additive constants and multiplicative constants may be used for each interval for a more accurate first approximation of the squareroot.

TABLE II

| BIT 3 | BIT 4 | BIT 5 | BIT 6 | VALUE OF MANTISSA |
|---|---|---|---|---|
| 0 | 0 | 0 | 0 | 1.0–1.0625 |
| 0 | 0 | 0 | 1 | 1.0625–1.125 |
| 0 | 0 | 1 | 0 | 1.125–1.1875 |
| 0 | 0 | 1 | 1 | 1.1875–1.25 |
| 0 | 1 | 0 | 0 | 1.25–1.3125 |
| 0 | 1 | 0 | 1 | 1.3125–1.375 |
| 0 | 1 | 1 | 0 | 1.375–1.4375 |
| 0 | 1 | 1 | 1 | 1.4375–1.5 |
| 1 | 0 | 0 | 0 | 1.5–1.5625 |
| 1 | 0 | 0 | 1 | 1.5625–1.625 |
| 1 | 0 | 1 | 0 | 1.625–1.6875 |
| 1 | 0 | 1 | 1 | 1.6875–1.75 |
| 1 | 1 | 0 | 0 | 1.75–1.8125 |
| 1 | 1 | 0 | 1 | 1.8125–1.875 |
| 1 | 1 | 1 | 0 | 1.875–1.9375 |
| 1 | 1 | 1 | 1 | 1.9375–2.0 |

Figure 7:
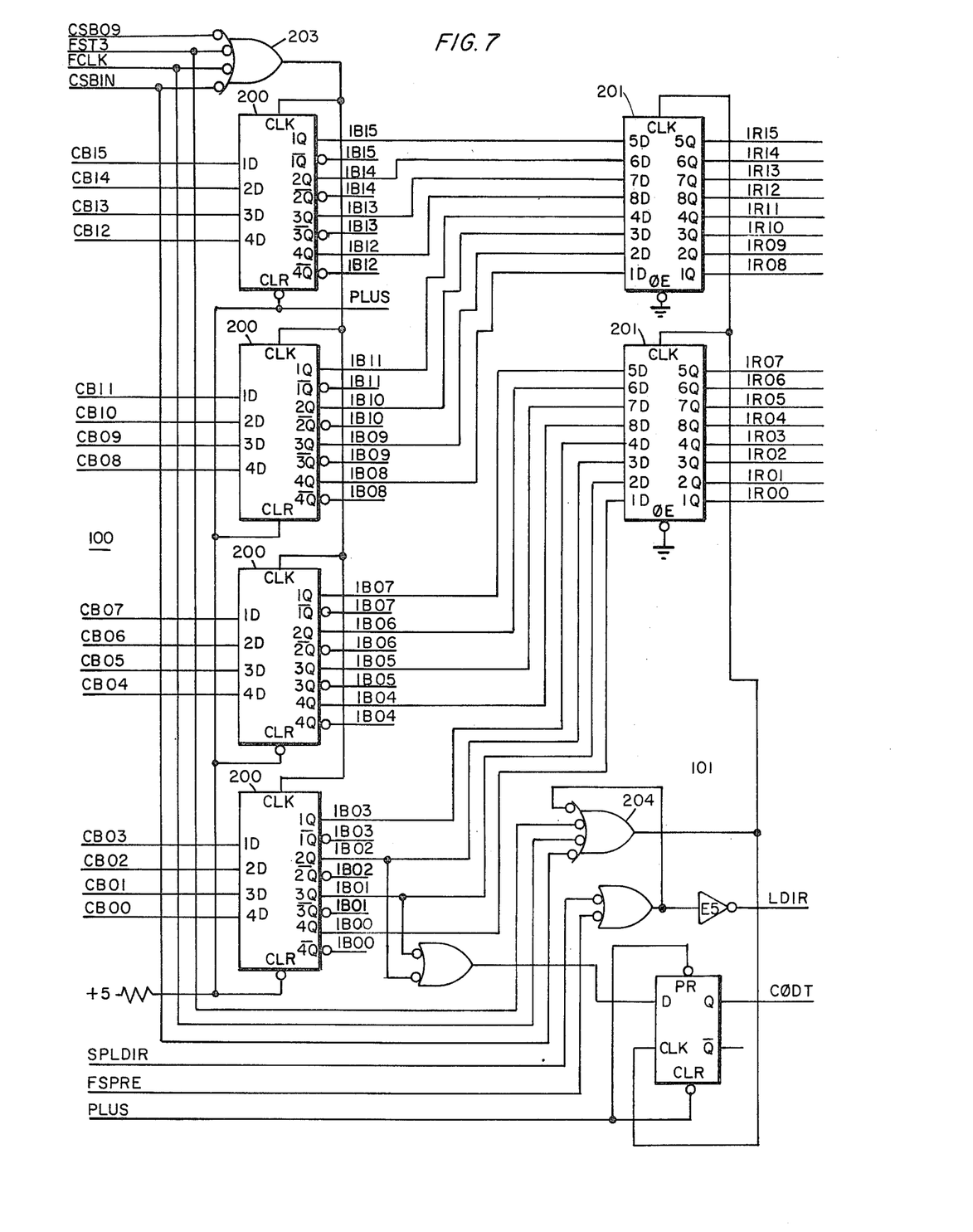
FIG. 7 is a detiled block diagram of an instruction buffer and instruction register used with this invention.

Referring now to FIG. 7 there is shown a more detailed block diagram of the instruction buffer 100 and instruction register 101. The instruction buffer comprises buffer circuits 200 which, in this embodiment, is formed of four separate but similar circuits 200. Together they form a 16-bit storage buffer. Likewise, instruction register 101 comprises two circuits 201 which together form another level of 16-bit storage.

Each of the circuits 200 receives data bus signals CB00-CB15 from data bus 13. These signals may come from the memory 17 or from the Floating Point Processor 18. The clear terminals (CLR) of circuits 200 are connected to a positive voltage source and disabled. The clock terminals of the circuits 200 are connected to NAND gate 203 which produces a clock signal to trigger the buffer circuits 200 at the appropriate time to permit the information contained in the CB signals to be entered and stored in circuits 200. Specifically, control signal CSB09 which is derived from the microinstruction being executed, enables the clock.

The output signals of circuits 200 are produced at the output terminals thereof and are designated as signals IB00 through IB15. In fact, the circuits produce each of these signals and the complements thereof. One set of the signals is supplied to pre-decoder 14 (see FIG. 5. Conversely, the other set of signals is supplied to instruction register 101 which includes circuits 201. The output enable terminals of circuits 201 are connected to ground and, therefore, the outputs are always enabled.

Conversely, the clock (CLK) terminals of circuits 201 are connected to the outputs of NAND gate 204 which is triggered by a clock signal much the same as gate 203. In this case, the control signal SPLDIR-, again derived from the microinstruction being executed, enables the clock. When circuits 201 are clocked, the input signals received from instruction buffer 100 are entered and stored therein and also applied as output signals IR00-IR15 which are applied to the macro-instruction decoder 16 and to the field selection multiplexer 102 as shown in FIG. 5.

Figure 8:
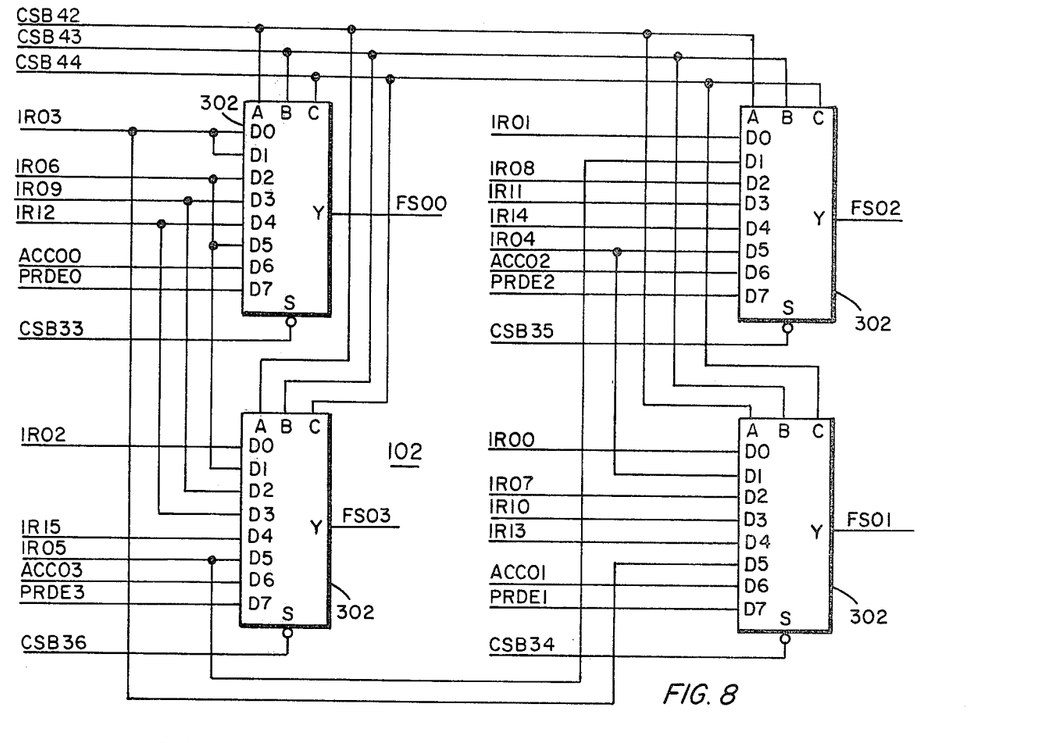
FIG. 8 is a detailed block diagram of the Here Plus One register used with this invention.

Referring now to FIG. 8, there is shown a more detailed block diagram of the field selection multiplexer 102. Again, the FS MUX 102 is shown as comprising four circuits 302 which can be designed differently depending upon the specific circuitry utilized. The FS MUX 102 circuits receive the instruction register signals IR00-IR15 along with signals PRDE0-PRDE3 from predecoder 14 as well as the signals ACC-00-ACC03 from an accumulator (not shown). FS MUX 102 produces the output signals FS00-FS03 as a function of the input signals as well as the control signals CSB42-44. Control signals CSB42-CSB44 again are derived from the microinstruction currently being executed, through control circuit 15 in FIG. 5. These control signals tell the FS MUX 102 the signal at which the input should be selected and passed to the output. For example, when the control signals CSB42, CSB43, CSB44 equal 1, 0, 0, respectively, the signal at input D1 is selected for each of the circuits 302. Therefore, the output signals FS00-FS03 will be the same as the input signals IR03-IR06, respectively.

Figure 9:
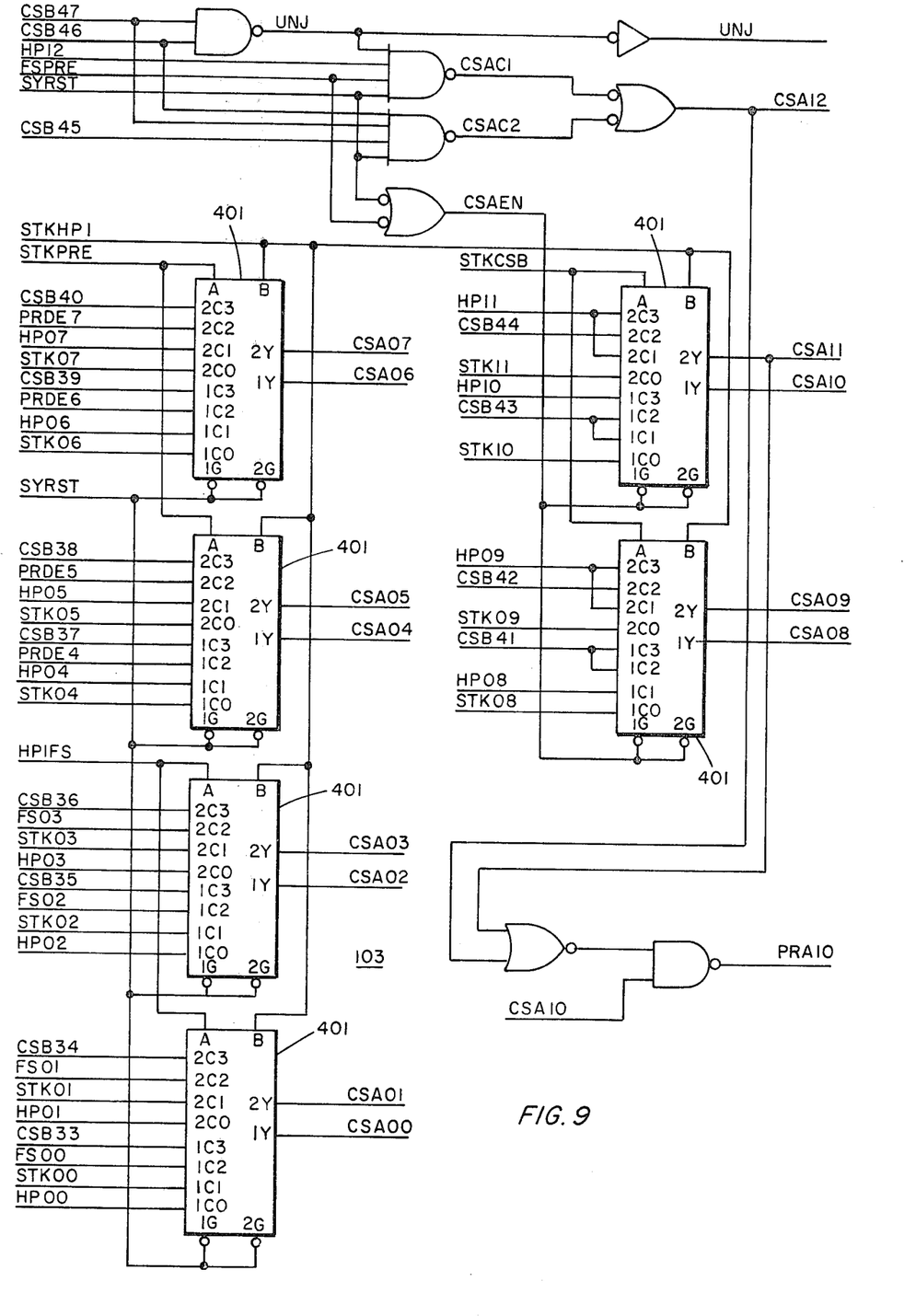
FIG. 9 is a detailed block diagram of the control store multiplexer used with this invention.

Referring now to FIG. 9, there is shown a more detailed block diagram of the control store address MUX 103. In this instance, the CSA MUX 103 comprises six circuits 401 but could comprise one or more circuits depending upon the specific implementation of the circuitry desired. Each of the circuits 401 receives input signals including signals from the pre-decoder 14, field selection multiplexer 102, control circuitry 10 and subroutine stack 12. In addition, the multiplexer circuits 401 receive system reset signals (SYRST) and control signals STKHP1, STKCSB, HP1FS, or STKPRE which are supplied to the A and B terminals of the respective multiplexers to determine which input signals should be selected and passed to the output terminals 1Y or 2Y as the output signals. These control signals are also derived from the microinstruction currently being executed. If the microinstruction currently being executed specifies the "field select" format, (see FIG. 3) control signals STKHP1A, STKPRE and STKCSB are inactive (logical high) and control signal HP1FS is active (logical low). Therefore, output signals CSA09 to CSA12 will be identical to input signals HP09 to HP12. These four output signals form the page address of the next microinstruction. (Bits HP09 to HP12 form the page address of the current microinstruction.) Output signals CSA04 to CSA08 will be identical to input signals CSB37 to CSB41. These five signals form the column address of the next microinstruction. (Bits CSB37 to CSB41 are derived from the current microinstruction.) Output signals CSA00 to CSA03 will be identical to input signals FS00 to FS03. These four signals form the row address of the next microinstruction. Since FS00 to FS03 come from the field select multiplexer (FS MUX) 102 in FIG. 8, the group of bits in the instruction register 201 selected by the FS MUX 102 becomes the row address for the next microinstruction. The output signals CSA00 to CSA12 of the multiplexer form the microaddress of the next microinstruction which is supplied to the control store circuit 104 (see FIG. 5) which can be formed of memory devices such as ROMS or the like.

In operation, the first word of the floating point number is loaded into the instruction register 101 via instruction buffer 100 from data bus 13. The field selection multiplexer selects bits 03–06 of the first 16-bit word of the floating point number as if it is an instruction. These four bits are the four bits which follow the most significant bit (MSB) of the mantissa. Thus, the four bits in the mantissa which are examined become the row address of the next microinstruction. Consequently, the microprogram will jump to the appropriate location in the microprogram stored in the control store. The location selected will depend upon the value of the four bits which are investigated.

To further illustrate the point, it should be recognized that in obtaining a squareroot of a floating point number, the area of concern is between 1.0 and 2.0 inasmuch as this is the area wherein the normalized number of the mantissa is located. In the instant device, the interval between the number 1.0 and 2.0 is subdivided into 16 equal intervals, i.e., 1.00–1.0625, 1.0625–1.125, ... 1.9375–2.00. An optimized linear approximation for $\sqrt{x}$ is found for each interval. With these 16 intervals a first approximation is obtained with an accuracy of 14.1 bits. In addition, by assigning row address designations to the respective intervals, the microprogram will branch to a unique address for each interval, as described above. By assigning optimized additive and multiplicative constants for each interval, the first approximation can be obtained to a very close accuracy with little or no additional circuitry over existing components. As a consequence, the Heron Iteration technique can be limited in numbers to obtain an equally accurate squareroot approximation in a relatively short time without extensive hardware implementation.

Thus, there is shown and described a circuit which permits a very accurate floating point number squareroot technique to be implemented. The circuit as shown and described includes a number of circuits which can be changed or altered as may be desirable. The specific circuits shown and described are illustrative only and are not intended to be limitative of the invention. For example, use of different integrated circuit chips or structures could possibly require or suggest other alternative circuit interconnections. The specific implementation of the circuit components can be considered to be design criterion. However, a suitable operable circuit is disclosed. It should be understood, that the scope of the invention is limited only by the claims appended hereto and not by the specific circuits shown and described.

Having thus described a preferred embodiment of the instant invention, what is claimed is:

1. A circuit for performing the squareroot function on a floating point number comprising,
   a source for supplying a floating point number,
   instruction register means connected to receive said floating point number from said source,
   decoder means connected to receive said floating point number from said instruction register means,
   field select multiplexer means connected to receive an address signal from said decoder means and a coded signal from said instruction register means,
   control store address multiplexer means also connected to receive a decode address signal from said decoder means and a field select address from said field select multiplexer means, and
   control store means for storing microprogram information therein and connected to receive a current address from said control store address multiplexer means such that the next microinstruction is selected to designate constants for linear approximations which depend upon the value of the floating point number.

2. The circuit recited in claim 2 wherein,
said instruction register means includes instruction buffer means connected to said source.

3. The circuit recited in claim 2 wherein,
said instruction buffer means receives signals from said source and supplies complementary output signals to said instruction register means and said decoder means.

4. The circuit recited in claim 1 wherein,
said source includes a floating point processor.

5. The circuit recited in claim 1 wherein,
said control store means comprises buffer means for producing an output signal representative of different input signals.

6. The circuit recited in claim 5 wherein,
said current address is supplied to a Here Plus One register which supplies a sequential address to said control store multiplexer means.

7. The circuit recited in claim 6 wherein,
said Here Plus One register supplies the address of the microinstruction presently under execution incremented by one.

8. The circuit recited in claim 5 including,
subroutine return stack means connected to supply a signal to said control store means.

9. The circuit recited in claim 8 wherein,
said subroutine return stack comprises at least one register which stores microinstruction addresses for use in high speed subroutine returns.

10. The circuit recited in claim 5 including,
control logic means for controlling the operation of each of said multiplexer means.

11. The circuit recited in claim 5 wherein,
said control store buffer means produces an output signal representative of at least portions of the next address for the microinstruction operation.

12. The circuit recited in claim 1 wherein,
said current address includes fields of bits which represent a page address, a column address and a row address.

13. The circuit recited in claim 1 including,
data bus means connecting said source to said instruction register means.

14. The circuit recited in claim 13 including,
storage means connected to said data bus means for supplying instructions thereto.

15. The circuit recited in claim 14 wherein,
said storage means comprises memory means.

16. The circuit recited in claim 1 wherein,
said source provides data to said instruction register means such that said instruction register means can decode said data and provide signals to said field select multiplexer means and said control store address multiplexer means to control the operation of a microprogram as a function of the decoded data.

17. The circuit recited in claim 1 wherein, said instruction register means stores an instruction currently in execution.

18. The circuit recited in claim 17 wherein, said instruction can be in the form of a data word representative of data from said source.

19. The circuit recited in claim 1 wherein, said decoder means includes pre-decoder means which performs a mapping operation on the signal recieved from said instruction register means and supplies a signal to said control store address multiplexer means.

20. The circuit recited in claim 1 wherein, said field select multiplexer means selects a field from the signals supplied by said instruction register means for specifying the next row address in field select addressing.

21. The circuit recited in claim 1 wherein, said control store means stores all of the microinstructions used by the circuit.

* * * * *